United States Patent
Rawlinson et al.

(10) Patent No.: US 8,448,966 B2
(45) Date of Patent: May 28, 2013

(54) VEHICLE FRONT SHOCK TOWER

(75) Inventors: Peter Dore Rawlinson, Worcestershire (GB); Hitendra Laxmidas Gadhiya, Irvine, CA (US); Alexi Charbonneau, Hermosa Beach, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 17 days.

(21) Appl. No.: 13/344,383

(22) Filed: Jan. 5, 2012

(65) Prior Publication Data

US 2012/0169023 A1   Jul. 5, 2012

Related U.S. Application Data

(60) Provisional application No. 61/430,108, filed on Jan. 5, 2011, provisional application No. 61/430,565, filed on Jan. 7, 2011, provisional application No. 61/430,622, filed on Jan. 7, 2011.

(51) Int. Cl.
*B62D 25/14* (2006.01)

(52) U.S. Cl.
USPC ...... 280/124.155; 280/124.134; 280/124.145; 280/124.147; 280/124.15; 296/193.09

(58) Field of Classification Search
USPC .............. 280/124.134, 124.145, 124.146, 280/124.155, 124.109, 124.147, 124.15, 280/124.141; 296/193.09, 203.01, 203.02
See application file for complete search history.

(56) References Cited

U.S. PATENT DOCUMENTS

| | | | | |
|---|---|---|---|---|
| 4,750,755 A | * | 6/1988 | Hayashi et al. | 280/124.136 |
| 4,957,307 A | * | 9/1990 | Gandiglio | 280/124.141 |
| 5,087,074 A | * | 2/1992 | Komatsu et al. | 280/788 |
| 5,169,171 A | * | 12/1992 | Ban et al. | 280/86.753 |
| 5,344,187 A | * | 9/1994 | Kreis et al. | 280/788 |
| 5,382,044 A | * | 1/1995 | Smith et al. | 280/124.109 |
| 5,516,130 A | * | 5/1996 | Mitchell | 280/124.134 |
| 5,536,035 A | * | 7/1996 | Bautz et al. | 280/124.139 |
| 6,105,984 A | * | 8/2000 | Schmitz et al. | 280/124.136 |
| 6,113,144 A | * | 9/2000 | Lapic | 280/788 |
| 6,719,314 B1 | * | 4/2004 | Schote | 280/124.135 |

FOREIGN PATENT DOCUMENTS

DE   4012418 A1 * 10/1991

* cited by examiner

*Primary Examiner* — Joseph Rocca
*Assistant Examiner* — James English
(74) *Attorney, Agent, or Firm* — Patent Law Office of David G. Beck

(57) ABSTRACT

A front structure for a vehicle is provided, the structure including a single piece shock tower and an upper control arm, where the front coupling of the upper control arm is attached to the shock tower at a location directly above a corresponding surface of the shock tower such that the front coupling is exposed from above, and where the rear coupling of the upper control arm is attached to the shock tower at a location directly below a corresponding surface of the shock tower such that the rear coupling is unexposed from above.

21 Claims, 9 Drawing Sheets

US 8,448,966 B2

VEHICLE FRONT SHOCK TOWER

CROSS-REFERENCE TO RELATED APPLICATION

The present application claims benefit of the filing date of U.S. Provisional Patent Application Ser. Nos. 61/430,108, filed 5 Jan. 2011, 61/430,565, filed 7 Jan. 2011, and 61/430,622, filed 7 Jan. 2011, the disclosures of which are incorporated herein by reference for any and all purposes.

FIELD OF THE INVENTION

The present invention relates generally to vehicle structures and, more particularly, to the front shock tower of a vehicle.

BACKGROUND OF THE INVENTION

Modern vehicles use a variety of different suspension structures and systems to absorb and control the transmission of vibrations arising from uneven road conditions while providing the desired level of vehicle control. In addition to providing passenger comfort and vehicle control, these structures and systems are preferably designed to be easily manufactured and repaired while being cost effective to produce and assemble.

SUMMARY OF THE INVENTION

The present invention provides a single piece shock tower in which the front coupling of the upper control arm is positioned directly above a corresponding surface of the shock tower such that the front coupling is exposed from above, and in which the rear coupling of the upper control arm is positioned directly below a corresponding surface of the shock tower such that the rear coupling is unexposed from above. Due to this configuration, in at least one embodiment the front coupling is attached to the shock tower from above while the rear coupling is attached to the shock tower from below. The shock tower includes a pass-through gap which permits control arm movement through the gap and which exposes a portion of the upper control arm (e.g., at least 75% or 85% of the upper control arm's top surface). In at least one embodiment the rear coupling is downwardly offset from the front coupling relative to an uppermost inner surface of the shock tower, with the downward offset preferably being in the range of 35 to 75 millimeters, and more preferably in the range of 50 to 60 millimeters. Preferably the front coupling is located between 15 and 35 millimeters below the uppermost inner surface of the shock tower while the rear coupling is located between 70 and 90 millimeters below the uppermost inner surface of the shock tower. A shock assembly may be attached to the uppermost inner surface of the shock tower. The shock tower of the invention may be cast, for example using a vacuum assisted high pressure die casting technique. Preferably the shock tower is fabricated from an aluminum alloy, although other materials may be used. Preferably the shock tower is configured to be attached to the top and a side surfaces of a front rail, for example via welding or riveting, where the front rail is preferably comprised of a polygonal-shaped upper hollow channel and a polygonal-shaped lower hollow channel, and where the upper and lower channels share a common wall. A shock tower brace may be coupled to an upper surface of the shock tower and to a vehicle structural element such as the dash assembly. A hood gas strut may be coupled to an upper surface of the shock tower. The front vehicle structure may include a cross-member that is interposed between, and welded to, mounting flanges on left hand and right hand shock towers.

A further understanding of the nature and advantages of the present invention may be realized by reference to the remaining portions of the specification and the drawings.

DESCRIPTION OF THE SPECIFIC EMBODIMENTS

Figure 1:
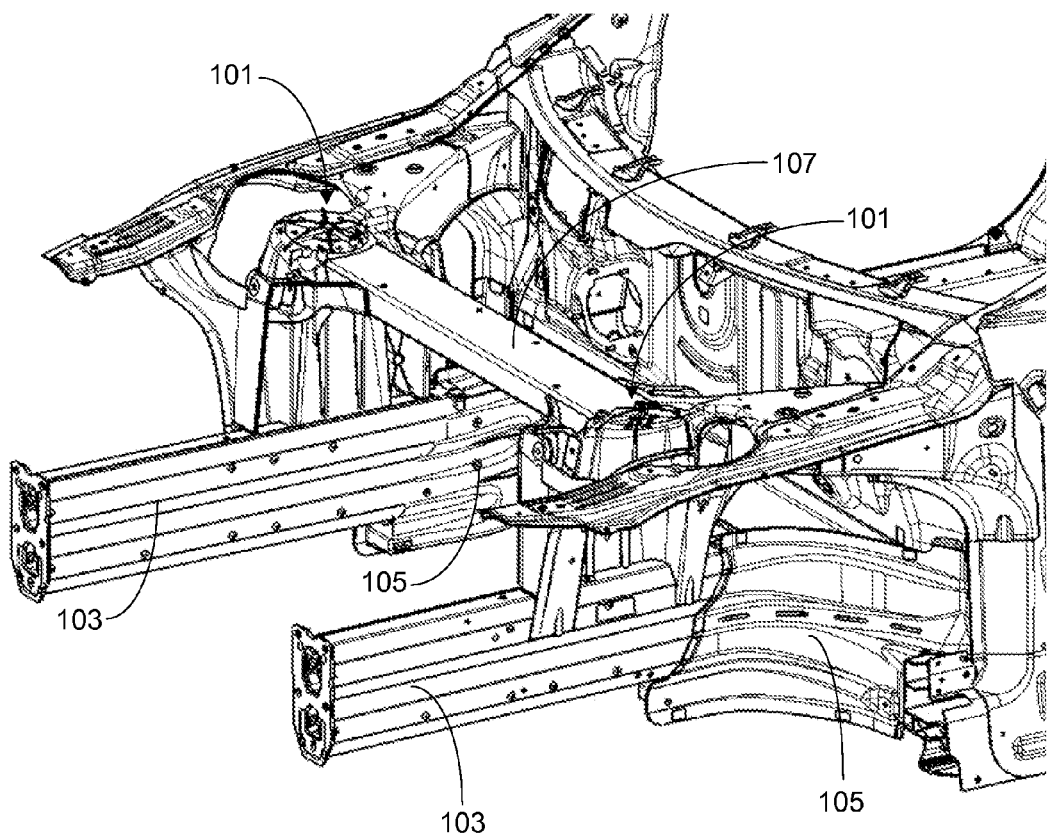
FIG. 1 provides a perspective view of the principal structures in the front portion of a vehicle in accordance with the invention.

FIG. 1 provides a perspective view of the principal structures in the front portion of a vehicle in accordance with the invention. In addition to shock towers 101, which are described in detail below, this figure shows a pair of front rails 103, a pair of front torque boxes 105 and a cross-member 107 that is mechanically coupled to, and interposed between, shock towers 101. In the illustrated embodiment, the vehicle side rails 103, which extend in a longitudinal direction and are located on opposite traverse sides of the vehicle as shown, are each comprised of a pair of polygonal-shaped, multi-walled channels that share a common wall, this design providing enhanced strength and rigidity in a relatively low-weight structure. Each of the multi-walled channels may be comprised of a regular or non-regular octagon-shaped structure; alternately, a regular or non-regular hexagon-shaped structure. Vehicle rails 103 are preferably fabricated from aluminum or an aluminum alloy using an extrusion process, although other materials and fabrication processes may be used. Additional detail is provided in co-pending U.S. patent application Ser. No. 13/337,070, filed 24 Dec. 2011, the disclosure of which is incorporated herein for any and all purposes. Curvilinear torque boxes 105 help to direct front impact load energy passing through rails 103 outward to the rocker panels. Preferably the torque boxes are fabricated from aluminum, for example using a high pressure die casting technique. Further description of a preferred embodiment of the front torque boxes is provided in co-pending U.S. patent application Ser. No. 13/337,076, filed 24 Dec. 2011, the disclosure of which is incorporated herein for any and all purposes.

Figure 2:
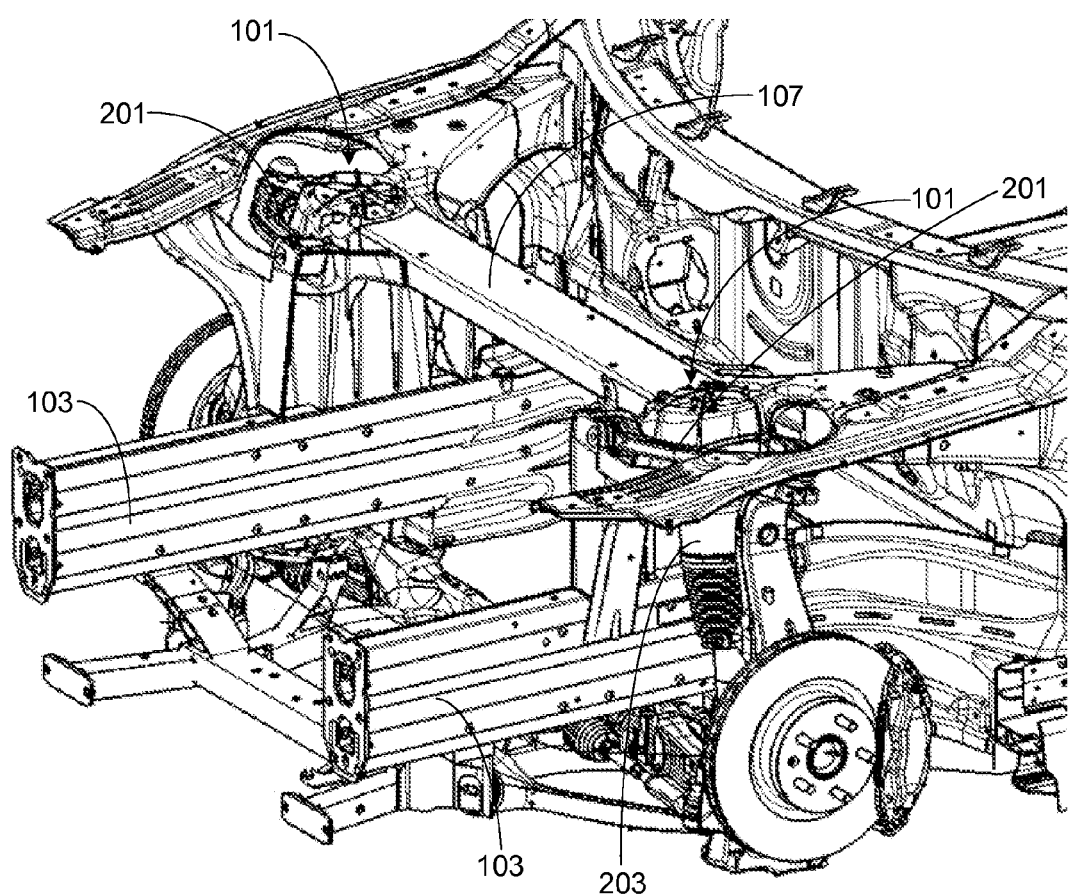
FIG. 2 provides the same view as that of FIG. 1, with the addition of the front suspension.

FIG. 2 provides the same view of the vehicle front structure shown in FIG. 1 with the addition of the front suspension. In this figure control arms 201 are visible as is the left hand shock assembly 203. Preferably shock tower 101 is fabricated from an aluminum alloy, for example using a vacuum assisted high pressure die casting technique. It will be appreciated that other materials (e.g., aluminum, steel, etc.) and fabrication techniques may be used. Additionally, in the preferred and illustrated embodiment the entire shock tower is fabricated as a single piece, i.e., a single piece casting, thus simplifying vehicle assembly. In order to achieve the desired strength and stiffness characteristics without adding multiple and separate reinforcement structures to the tower, the wall thicknesses of the tower structure 101 are varied and rib structures are added to the design.

Figure 3:
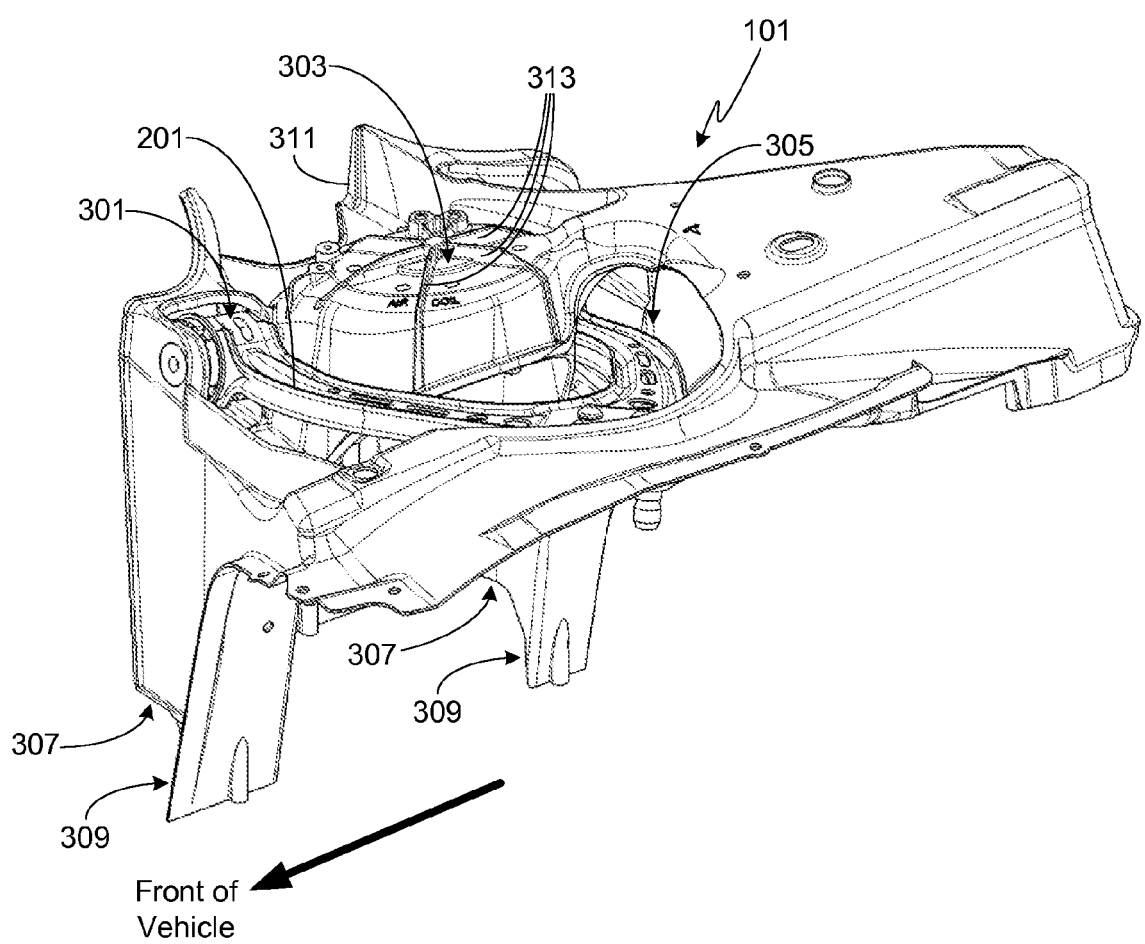
FIG. 3 provides a detailed perspective view of a shock tower and corresponding upper control arm in accordance with the invention.

FIG. 3 provides a detailed perspective view of one of the shock towers 101 shown in FIGS. 1 and 2. Shock towers 101, and the corresponding upper control arms 201, have been designed to allow a very low hood profile while still providing a sufficient gap (e.g., on the order of 70-75 millimeters) between the tower/control arm assembly and the inner surface of the hood to meet head impact requirements and insure pedestrian safety in the event of a vehicle/pedestrian collision. As shown, control arm 201 is attached to the shock tower at an angle, rather than being attached within a horizontal plane. Specifically, the front coupling 301 of the upper control arm 201 is attached to the top portion of the shock tower 101, for example with the axis of coupling 301 being located between 15 and 35 millimeters below the uppermost inner surface of the tower (labeled as "303" in the figure), and more preferably, on the order of 25 to 26 millimeters below the uppermost inner surface of the tower. In contrast, the rear coupling (not visible in this figure) is attached below the tower casting, preferably with the axis of the rear coupling being between 70 and 90 millimeters below the uppermost inner surface 303 of the tower, and more preferably, on the order of 79 to 80 millimeters below the uppermost inner surface of the tower. As a result of this configuration, the front and rear control arm couplings are offset from one another by between 35 and 75 millimeters, and preferably by between 50 and 60 millimeters, relative to the uppermost inner surface of the shock tower.

As a result of the configuration of the control arm couplings, and specifically the front coupling 301, the front portion of the control arm is completely exposed from the top. Additionally, due to the front control arm coupling being above the tower casting, and given the desired range of arm movement, much of the upper surface of the control arm is exposed through the pass-through gap 305 within the shock tower (i.e., typically on the order of at least 75 percent of the upper surface of the control arm is exposed, and preferably on the order of at least 85 percent of the upper surface of the control arm is exposed). As noted, pass-through 305 is needed to allow proper control arm movement while locating the front coupling 301 above the tower casting.

In the illustrated embodiment, shock tower 101 is positioned on top of, and mechanically coupled to, the top surface of the front rails 103. As shown, shock tower 101 includes multiple flanges 307 that are coupled to the top surface of rails 103, and multiple flanges 309 that are coupled to the outer surface of rails 103. Preferably the shock towers are welded to the front rails although other techniques, such as rivets, may be used to couple the shock towers to the front rails. This figure also shows the flange 311 which is attached, preferably via welding or riveting, to cross-member 107. Some of the rib structures 313 used to improve the strength and stiffness of tower 101 are visible in this figure.

Figure 4:
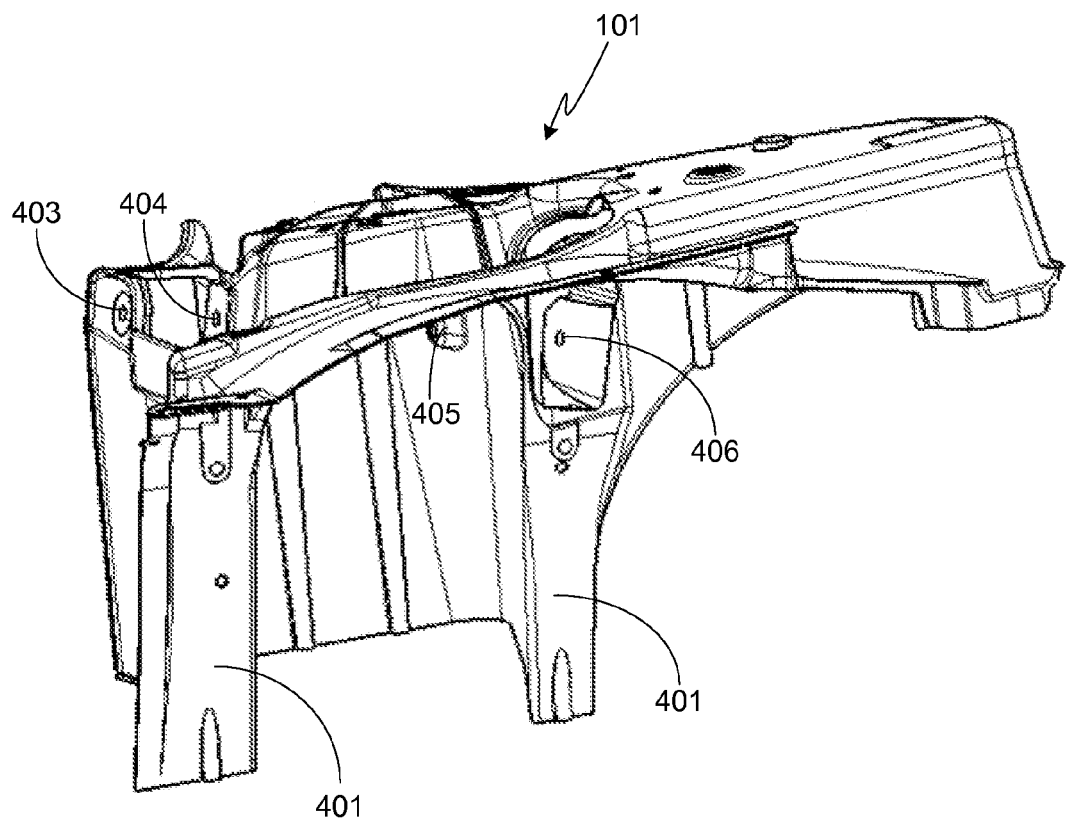
FIG. 4 provides an inside perspective view of the shock tower shown in FIGS. 1-3.

FIG. 4 provides an inside perspective view of shock tower 101 (i.e., inside relative to the vehicle centerline). Surfaces 401 are dome-shaped in order to transfer the load evenly from the strut mounting plane to the front rail, thus achieving very high localized stiffness. As the control arm is not shown in FIG. 4, the attachment points for the control arm are clearly visible. Specifically, the front control arm coupling is attached at points 403/404, and the rear control arm coupling is attached at points 405/406. Due to the configuration of the shock tower and the need to maximize available package space, the attachment of the front control arm coupling at 403/404 is installed from the top while the attachment of the rear control arm coupling at 405/406 is installed from the bottom.

Figure 5:
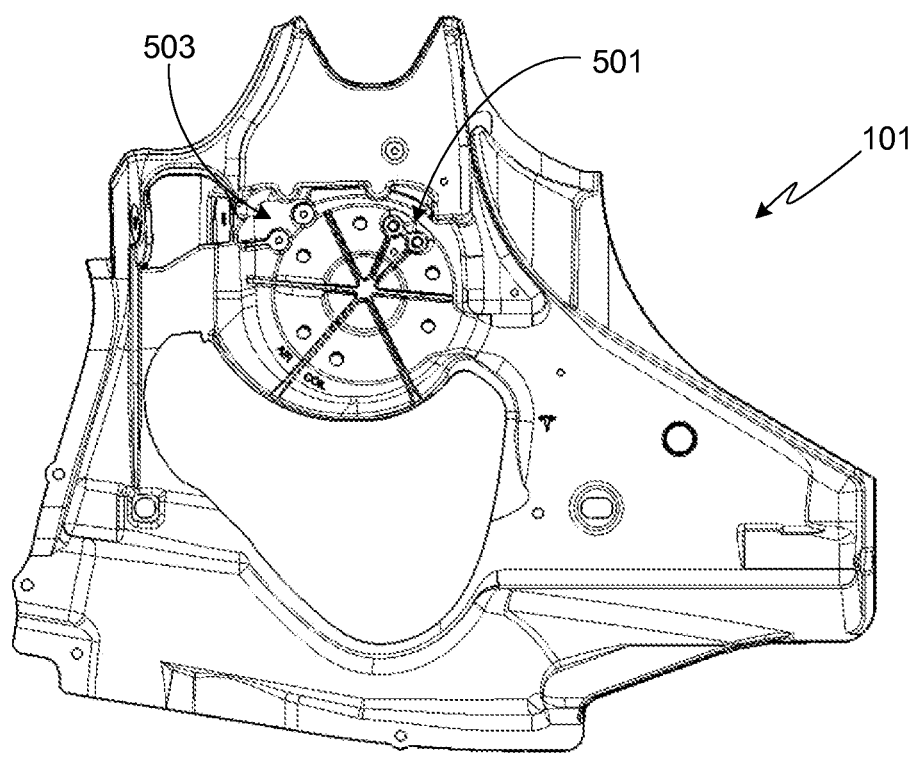
FIG. 5 provides a top view of the shock tower shown in FIGS. 1-4.
Figure 6:
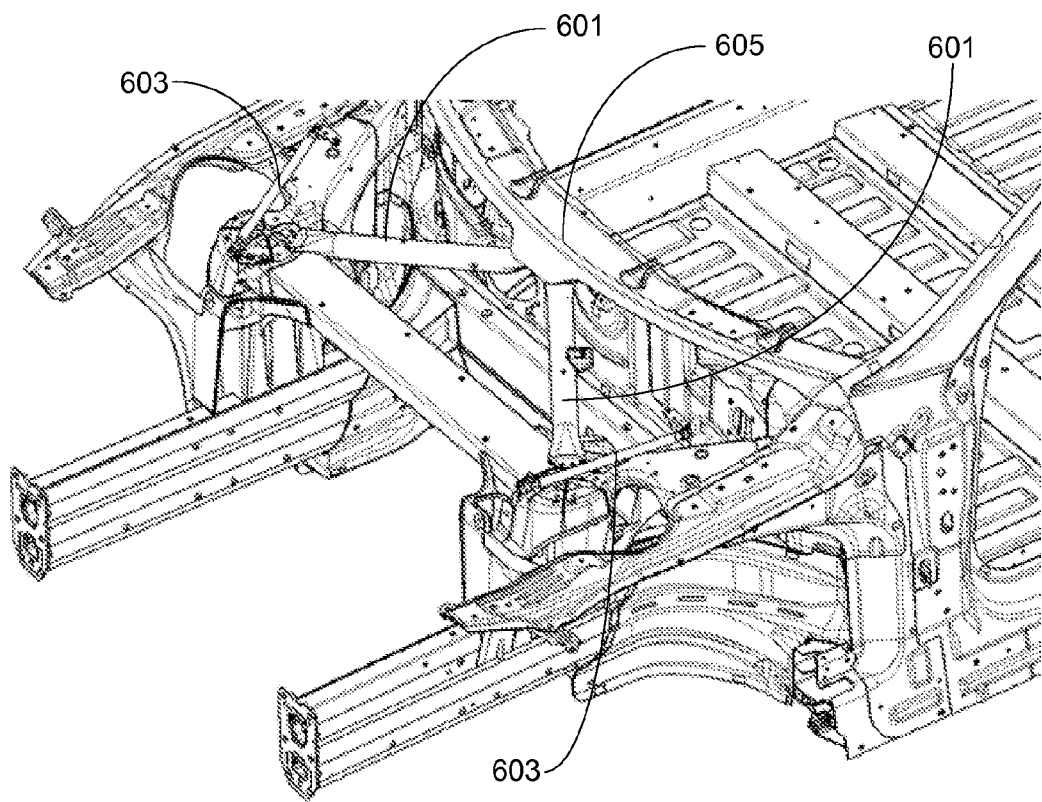
FIG. 6 provides a similar view of the vehicle front structures as that provided in FIG. 1, with the addition of shock tower bracing members and hood gas struts.

FIG. 5 provides a top view of shock tower 101. Visible in FIG. 5 are mounts 501 for a shock tower brace and mounts 503 for the hood gas strut. Shock tower braces 601 and hood gas struts 603 are shown in FIG. 6. Braces 601 are shown attached to the vehicle's dash assembly 605.

Figure 7:
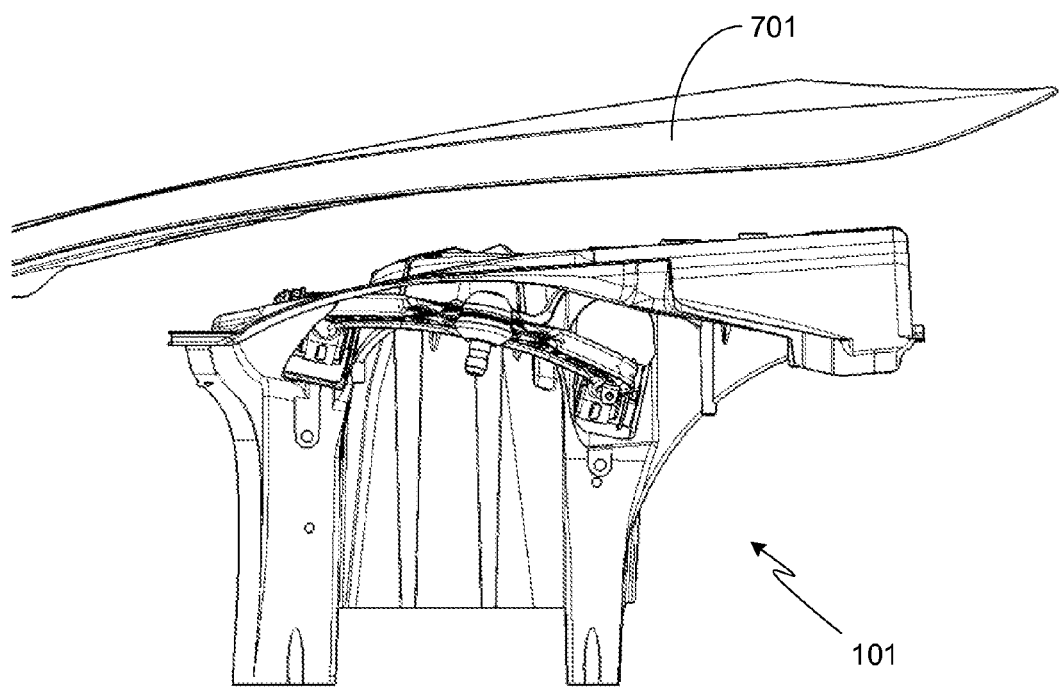
FIG. 7 provides a side view of the shock tower relative to the vehicle's hood.
Figure 8:
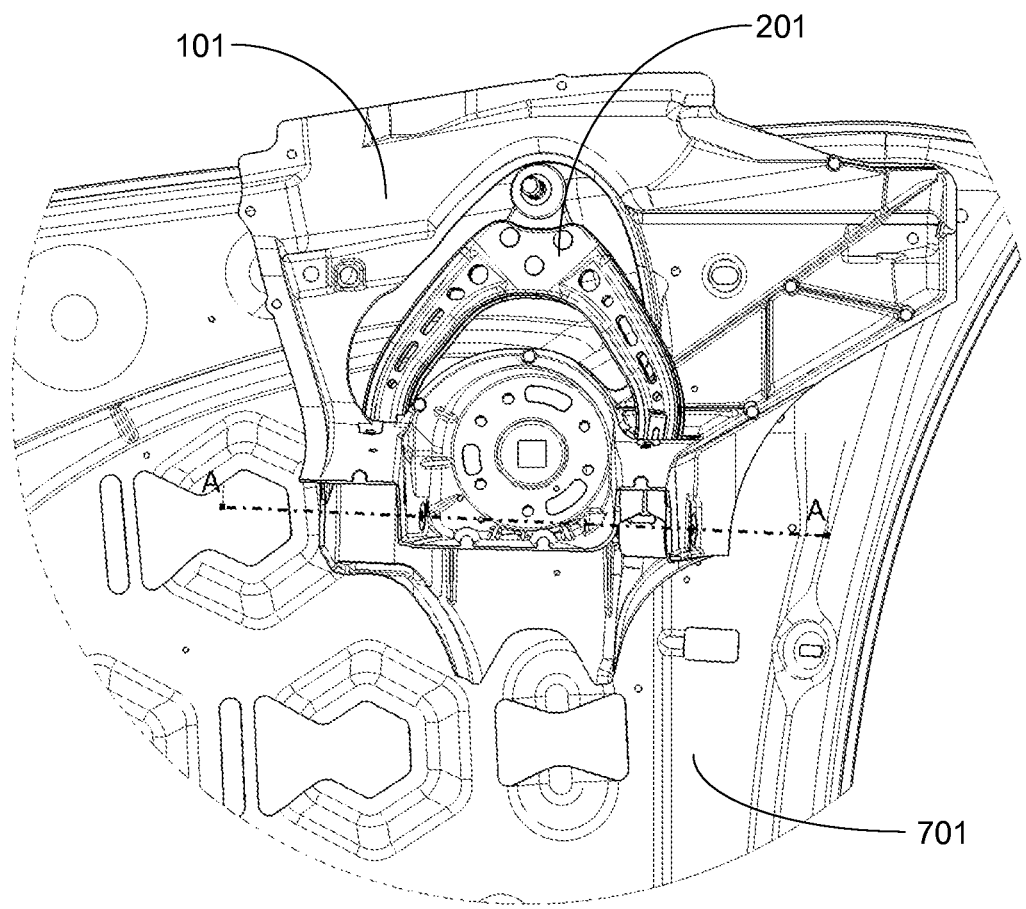
FIG. 8 provides a bottom view of the shock tower.
Figure 9:
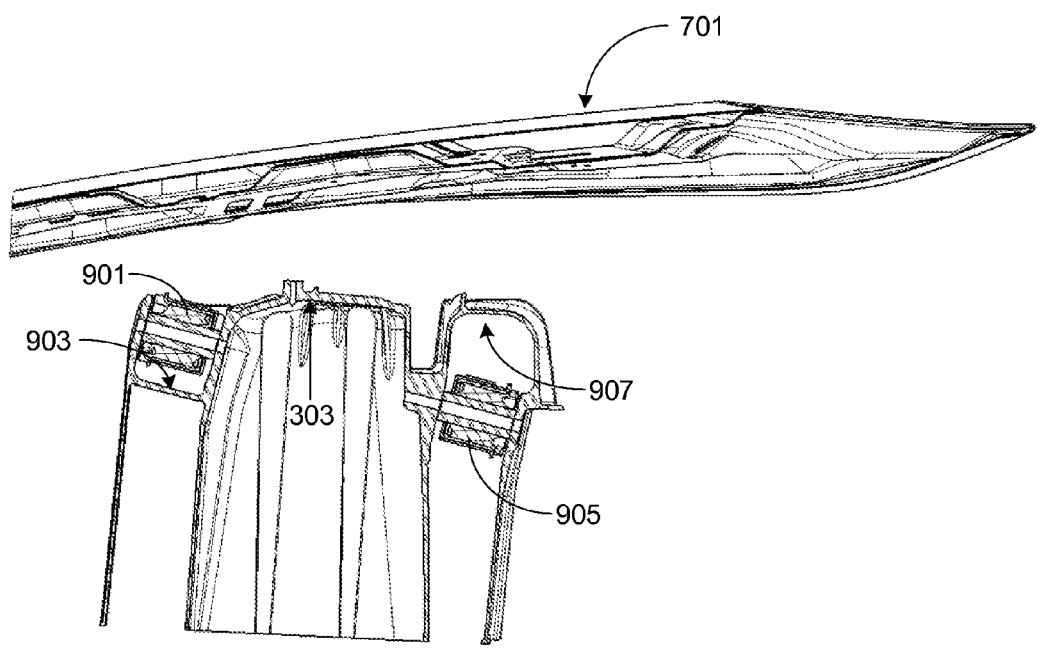
FIG. 9 provides a cross-section of the shock tower taken through a plane passing through the control arm bolts.

FIG. 7 provides a side view of shock tower 101 relative to hood 701, with the hood shown in the closed position. FIG. 8 provides a bottom view of the shock tower while FIG. 9 provides a cross-section of the shock tower taken through a plane A-A which passes through the control arm coupling bolts. Note that the cross-sectional view clearly shows that the front control arm coupling 901 is above the shock tower casting, i.e., above surface 903, while the rear control arm coupling 905 is below the shock tower casting, i.e., below surface 907.

It should be understood that identical element symbols used on multiple figures refer to the same component, or components of equal functionality. Additionally, the accompanying figures are only meant to illustrate, not limit, the scope of the invention and should not be considered to be to scale.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention which is set forth in the following claims.

What is claimed is:

1. A front structure of a vehicle comprising:
   a shock tower, wherein said shock tower is comprised of a single piece of material; and
   an upper control arm mechanically coupled to said shock tower and mechanically coupled to a front vehicle suspension system, wherein said upper control arm further comprises a front coupling integral to said upper control arm and a rear coupling integral to said upper control arm, wherein said upper control arm is mechanically coupled to said shock tower via said front coupling and said rear coupling, wherein said front coupling is positioned directly above a corresponding first surface of said shock tower and wherein said front coupling is exposed from above, and wherein said rear coupling is positioned directly below a corresponding second surface of said shock tower and wherein said rear coupling is covered by said second surface of said shock tower and is unexposed from above.

2. The front structure of claim 1, wherein said front coupling is attached to said shock tower from above said corresponding first surface of said shock tower, and wherein said rear coupling is attached to said shock tower from below said corresponding second surface of said shock tower.

3. The front structure of claim 1, said shock tower further comprising a pass-through gap, wherein a portion of said upper control arm is exposed from above by said pass-through gap, and wherein said portion of said upper control arm is permitted movement through said pass-through gap.

4. The front structure of claim 3, wherein said portion of said upper control arm is comprised of at least 75 percent of a top surface area of said upper control arm.

5. The front structure of claim 3, wherein said portion of said upper control arm is comprised of at least 85 percent of a top surface area of said upper control arm.

6. The front structure of claim 1, wherein said rear coupling is downwardly offset from said front coupling relative to an uppermost inner surface of said shock tower.

7. The front structure of claim 6, wherein said downward offset is in the range of 35 to 75 millimeters.

8. The front structure of claim 7, wherein said downward offset is in the range of 50 to 60 millimeters.

9. The front structure of claim 6, wherein said front coupling is located between 15 and 35 millimeters below said uppermost inner surface of said shock tower, and wherein said rear coupling is located between 70 and 90 millimeters below said uppermost inner surface of said shock tower.

10. The front structure of claim 6, wherein a shock assembly is attached to said uppermost inner surface of said shock tower.

11. The front structure of claim 1, wherein said shock tower is cast.

12. The front structure of claim 11, wherein said shock tower is cast with a vacuum assisted high pressure die casting technique.

13. The front structure of claim 1, wherein said shock tower is comprised of a material selected from the group of materials consisting of aluminum, aluminum alloys and steel.

14. The front structure of claim 1, further comprising a front rail, wherein said shock tower further comprises a side mounting flange and a top mounting flange, wherein said side mounting flange is mechanically coupled to a side surface of said front rail and wherein said top mounting flange is mechanically coupled to a top surface of said front rail.

15. The front structure of claim 14, wherein said side mounting flange is welded to said side surface of said front rail and wherein said top mounting flange is welded to said top surface of said front rail.

16. The front structure of claim 14, wherein said side mounting flange is riveted to said side surface of said front rail and wherein said top mounting flange is riveted to said top surface of said front rail.

17. The front structure of claim 14, wherein said front rail is comprised of a polygonal-shaped upper hollow channel and a polygonal-shaped lower hollow channel, and wherein said polygonal-shaped upper hollow channel and said polygonal-shaped lower hollow channel share a common wall.

18. The front structure of claim 1, wherein said shock tower corresponds to a left side shock tower, wherein said front structure further comprises a second shock tower corresponding to a right side shock tower, and wherein said front structure further comprises a cross-member interposed between and mechanically coupled to said left side shock tower via a first mounting flange and to said right side shock tower via a second mounting flange.

19. The front structure of claim 1, further comprising a shock tower brace, wherein said shock tower brace is mechanically coupled to an upper surface of said shock tower and to a vehicle structural element.

20. The front structure of claim 18, said vehicle structural element comprising a vehicle dash assembly.

21. The front structure of claim 1, further comprising a hood gas strut mechanically coupled to an upper surface of said shock tower.

* * * * *